Figure 1:
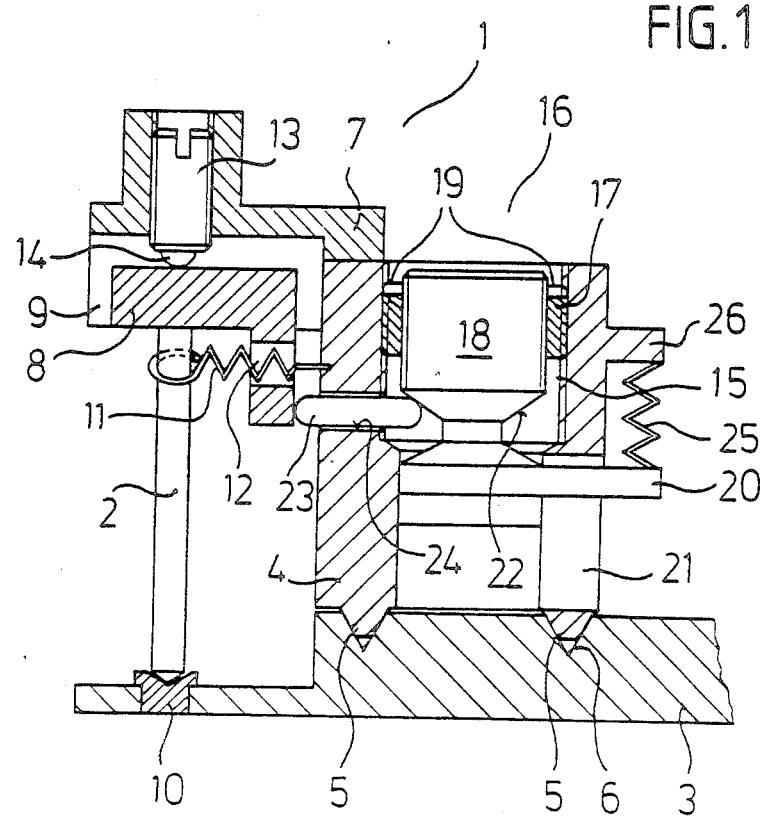

United States Patent [19]

Schäeffer et al.

[11] Patent Number: 4,709,288
[45] Date of Patent: Nov. 24, 1987

[54] ADJUSTING MEANS IN PARTICULAR FOR GUIDE ELEMENTS, AND MAGNETIC TAPE CASSETTE POSSESSING SUCH MEANS

[75] Inventors: Norbert Schäeffer, Deidesheim; Guenter Bettinger, Schifferstadt; Klaus Goetz, Neustadt; Dietmar Pfefferkorn, Hemsbach; Ottmar Buerkle, Offenburg; Kurt Schmidts, Kehl, all of Fed. Rep. of Germany; Pierre Schneider, Erstein, France; Werner Wagner, Oberkirch, Fed. Rep. of Germany; Dieter Wiethoelter, Gien, France; Herbert Dietze, Berghaupten; Wilhelmus Andriessen, Wachenheim, both of Fed. Rep. of Germany

[73] Assignee: BASF Aktiengesellschaft, Ludwigshafen, Fed. Rep. of Germany

[21] Appl. No.: 874,832

[22] Filed: Jun. 16, 1986

Related U.S. Application Data

[63] Continuation of Ser. No. 519,592, Aug. 2, 1983, abandoned.

[30] Foreign Application Priority Data

Aug. 4, 1982 [DE] Fed. Rep. of Germany ... 8222016[U]

[51] Int. Cl.⁴ ....................... G11B 23/04; G11B 15/60
[52] U.S. Cl. ............................... 360/130.21; 360/132; 242/199
[58] Field of Search ..................... 360/93, 96.1, 130.2, 360/130.21, 132, 130.22, 130.23; 242/197, 199, 75.1; 226/189

[56] References Cited

U.S. PATENT DOCUMENTS

| 4,097,006 | 6/1978 | Saito | 242/199 |
| 4,248,393 | 2/1981 | Mogi | 242/199 |

FOREIGN PATENT DOCUMENTS

| 1051579 | 1/1954 | France | 360/109 |
| 384128 | 8/1973 | U.S.S.R. | 360/109 |
| 600608 | 3/1978 | U.S.S.R. | 360/109 |
| 777705 | 7/1980 | U.S.S.R. | 360/109 |

Primary Examiner—Stuart N. Hecker
Assistant Examiner—Benjamin E. Urcia
Attorney, Agent, or Firm—Keil & Weinkauf

[57] ABSTRACT

An adjusting means for tape guide elements or magnetic heads effects adjustment exclusively in a plane at right angles to a reference surface. A fine adjustment mechanism, in particular a micrometer screw device, provides high accuracy of adjustment over a sufficiently wide range. The adjusting means can be used in any kind of magnetic tape cassette. Advantageous embodiments of such magnetic tape cassettes also form part of the present invention. By using the novel adjusting means, azimuth and skew losses can be compensated for in a simple manner.

7 Claims, 7 Drawing Figures

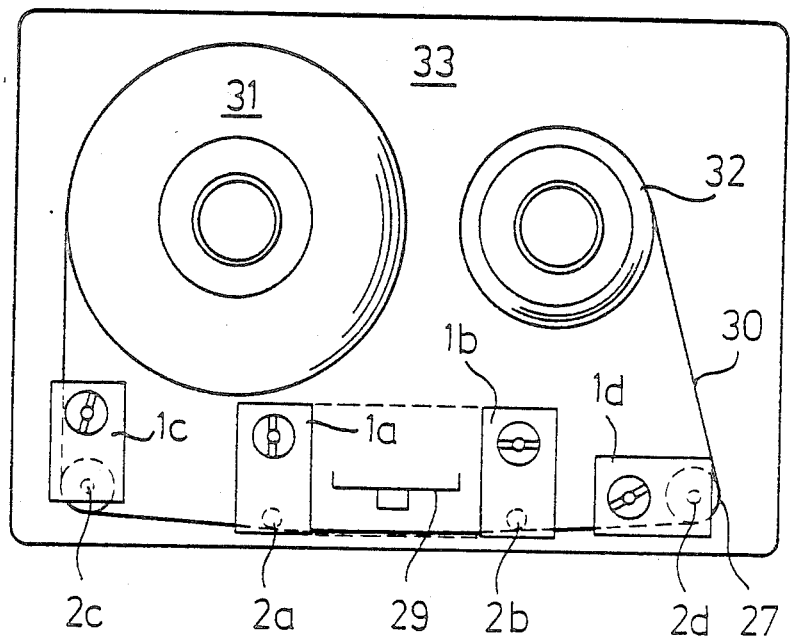

ADJUSTING MEANS IN PARTICULAR FOR GUIDE ELEMENTS, AND MAGNETIC TAPE CASSETTE POSSESSING SUCH MEANS

This application is a continuation of application Ser. No. 519,592, filed on Aug. 2, 1983, now abandoned.

The present invention relates to an adjusting means in particular for guide elements for tape-like or strip-like recording media, especially magnetic tapes, by means of which at least one guide element which is movable relative to a reference surface can be adjusted manually over a predetermined range, and also relates to a magnetic tape cassette, in particular a compact cassette, having at least one such adjusting means.

A compact cassette having means for adjusting tape guide pins on both sides of the opening for the magnetic head has been disclosed. The position of each pin can be adjusted by means of an eccentric device, the free end of the pin describing an elliptical path. The pins therefore inevitably move in two planes. Moreover, the range over which adjustment is possible is too small, and adjustment is too difficult to carry out and cannot be effected with the necessary precision.

It is an object of the present invention to provide an adjusting means for use in magnetic tape cassettes in particular, which, in spite of the high accuracy of adjustment, does not require any special skill when effecting adjustment and whose range of adjustment is sufficiently large to take into account all errors which occur in practice due to head gap tilt and tape skew. Such an adjusting means is also suitable for the positioning of magnetic heads in tape recorders.

We have found that this object is achieved, in accordance with the invention, by an adjusting means in particular for guide elements for tape-like or strip-like recording media, especially magnetic tapes, by means of which at least one guide element which is movable with respect to a reference surface can be adjusted manually over a predetermined range, wherein the means for adjusting the guide element is located exclusively in a plane at right angles to the reference surface.

With the novel adjusting means it is possible to fix the direction of adjustment in a single plane although, depending on the arrangement of the adjusting means with respect to the reference surface, any misalignment error can be compensated for.

In a practical embodiment, the adjusting means includes a guided, displaceable member which has an inclined surface, continuous adjustment thus being achieved in a simple manner.

In a further embodiment, the displaceable member possessing an inclined surface is guided in the plane of adjustment.

A member having an inclined surface, in the form of a tapered screw, for the one-time setting of the vertical position of the magnetic head relative to a very narrow track of a magnetic tape in a video recorder is disclosed, for example, in German Laid-Open Application DOS No. 2,431,545. The tapered screw adjusts the position of a precision ball, mounted on a head support, relative to a cam plate which, on rotation, determines the position of the head relative to a single track.

The use of such a device, also known as a head stepper, for tape guide adjustment means according to the present invention is not readily possible and is also not obvious.

In a practical embodiment, a micrometer screw device is provided for adjustment of the member having an inclined surface; the dimensions of the screw threads determine the accuracy of adjustment that can be achieved.

Advantageously, the member having an inclined surface is fastened to the adjusting part of the micrometer screw device or forms an integral part thereof.

In accordance with the invention, one end of the tape guide element is fixedly mounted on the reference surface, and the other end is mounted in a displaceable holder. Furthermore, a transmission element is provided between the member with the inclined surface and the holder.

It can be advantageous in practice if the adjusting part is provided with means for preventing it and the setting part of the micrometer screw device from rotating with respect to one another.

To achieve a precise setting, it is advantageous for at least one rotation, preferably several rotations, of the setting part to give the maximum travel of the adjusting part or of the member having an inclined surface.

A magnetic tape cassette having adjusting means according to the invention advantageously includes an adjusting means for each of the tape guide elements closest to the opening for the magnetic head. This enables optimum guidance of the tape with respect to the particular head gap to be achieved, with the result that azimuth and skew losses are minimized.

It is also advantageous to provide adjusting means for each of the turn-around guide members in order to ensure that these have a favorable effect on the recording and playback operations and on the shape of the tape roll.

To simplify the construction, it is possible to provide common adjusting means for several tape guide elements and turn-around guide members.

In yet another advantageous embodiment, holes are provided in the upper and/or lower walls of the housing, into which holes the adjusting means can be inserted. As a result, the position of the vertical adjustment plane can be altered with respect to the reference surface, and any desired tape path can be set up by adjusting the tape guide elements and turn-around guide members.

Figure 2:
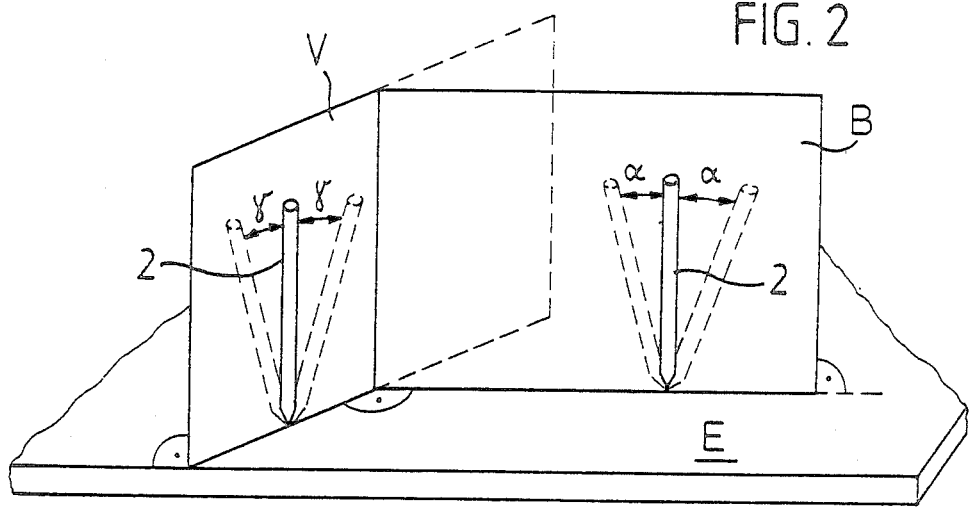
Figure 3:
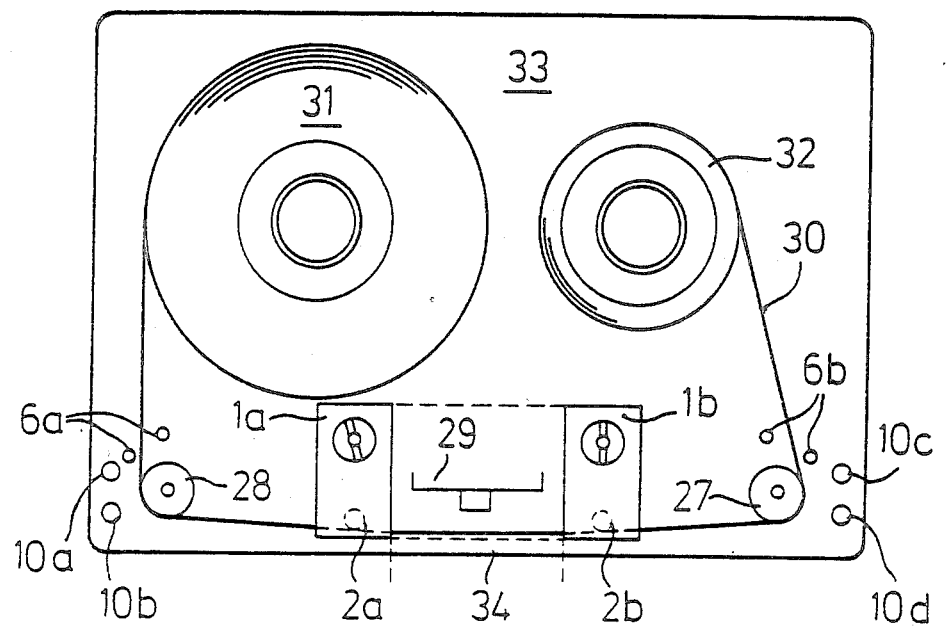
Figure 4:
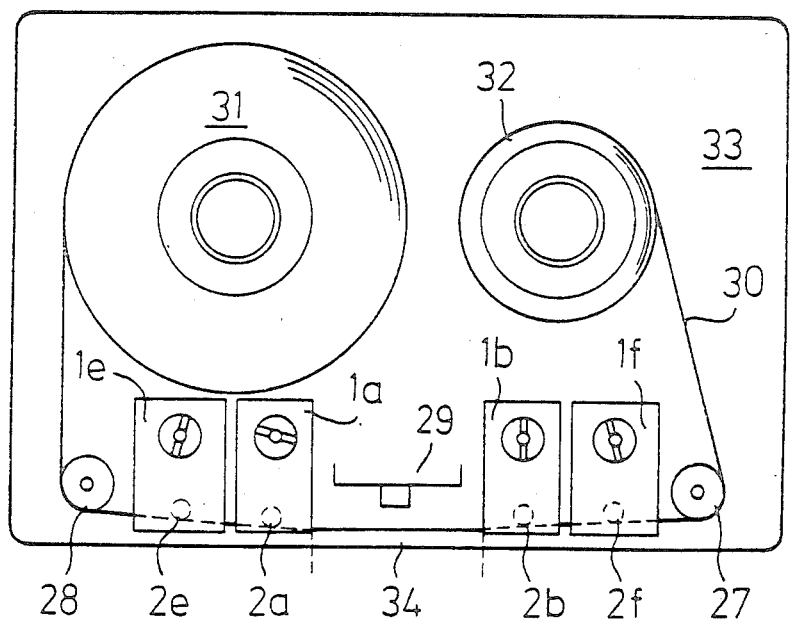
Figure 6A:
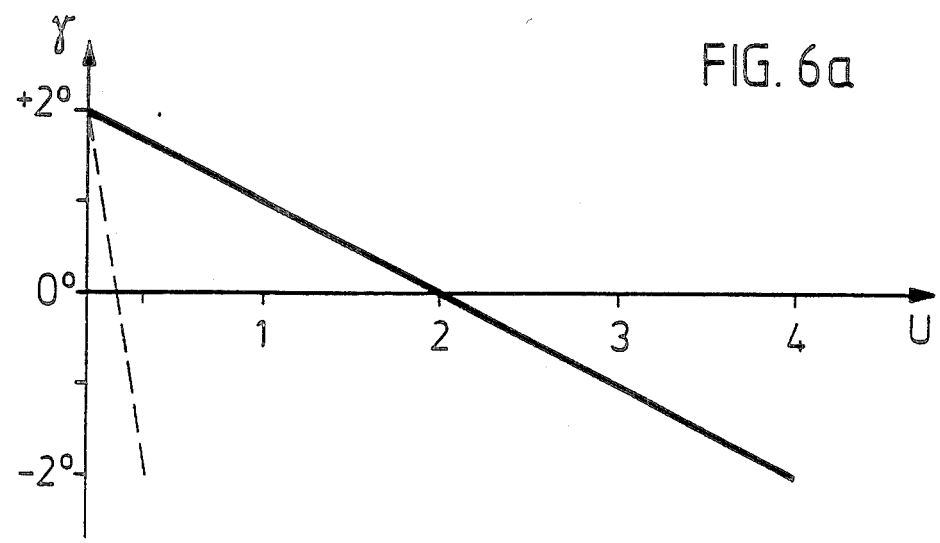
Figure 6B:
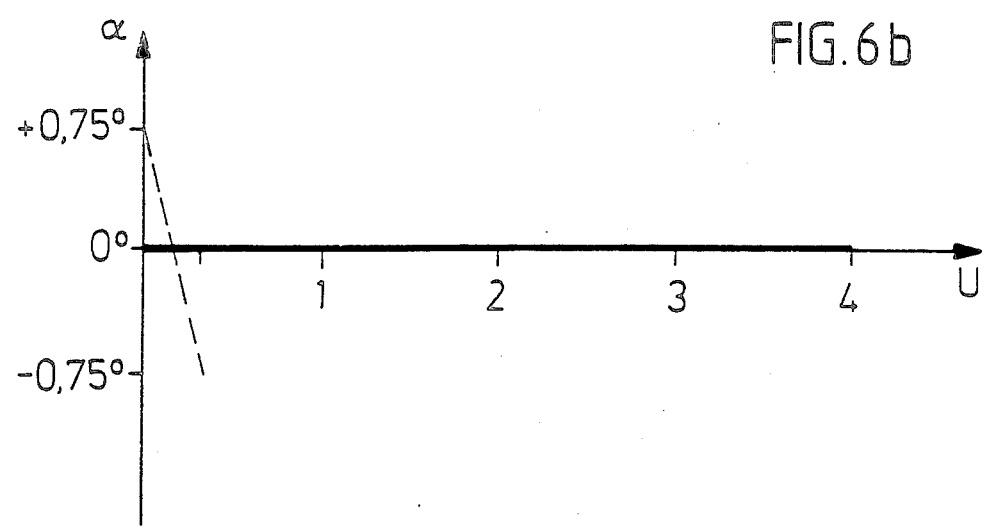

Further details of the invention are disclosed in the following description of the embodiments given by way of example and illustrated in the accompanying drawings, in which FIG. 1 is a partial cross-sectional view of the novel adjusting means, FIG. 2 is a diagram showing the adjustment planes with respect to the reference surface, FIG. 3 shows a cassette having one adjustable guide element on each side of the opening for the head, FIG. 4 shows a cassette having two adjustable guide elements on each side of the opening for the head, FIG. 5 shows a cassette as illustrated in FIG. 3 but with additional adjusting means for the turn-around guide members, and FIGS. 6a and 6b are diagrams showing the relationship between the change in angle and the number of turns of the adjusting screw.

An adjusting means 1 for a tape guide element (in this case a steel pin 2) is suitably mounted on a reference plate 3 whose surface constitutes reference plane E. Adjusting means 1 is essentially a precision screw device which, in accordance with the invention, displaces a tape guide pin or a tape guide roll or a plurality of such tape guide elements exclusively in one adjustment plane with respect to reference plane E. The novel adjusting means can of course be used with advantage to adjust the position of magnetic heads relative to the tape.

A mounting block 4 is suitably mounted, eg. via conical pins 5 and matching conical holes 6 as shown in FIG. 1, on reference plate 3, which can be precision-ground annealed stainless steel plate or a perfectly flat distortion-free cassette wall. Arm 7, which includes a holder 8 for steel pin 2, is fastened to block 4. Holder 8 is displaceably guided in a vertical groove 9 in arm 7. The lower end of steel pin 2 is mounted in a stationary centering bearing 10 on reference plate 3. The upper end is fixed in a matching hole in holder 8, and can therefore pivot with the holder. A tension spring 11 is attached to pin 2, close to holder 8; this spring, extending through hole 12 and fastened to block 4, prevents play between block 4, holder 8 and pin 2. In arm 7, above holder 8, a vertically adjustable hollow screw 13 containing a spring-loaded ball 14 is provided, by means of which holder 8 and pin 2 are biased against bearing 10.

A dental hole 15 is provided in block 3, and the precision adjustment mechanism, in this case a micrometer screw device 16, is located in this hole. This device 16 consists essentially of a setting part, sleeve 17, and an adjusting part, i.e. threaded member 18, which parts can move relative to one another in a vertical direction. Sleeve 17 is mounted with its outer thread in the inner thread of hole 15 and with its inner thread cooperating with the thread on the peripheral surface of member 18, and can be rotated from above via slots 19. When sleeve 17 is turned, threaded member 18 moves vertically upwards or downwards. To ensure that this vertical movement is determined exclusively by the sleeve 17, member 18 is provided with a pin 20 for preventing rotation thereof; this pin 20 is slidably guided in a vertical slot 21 in block 4.

The central part of threaded member 18 is waisted, being provided with a groove having inclined walls. The conical surface governs the lateral displacement of pin 2. The range of adjustment can be predetermined by appropriate choice of the angle of slope of the inclined walls. Advantageously, several rotations of setting part 17 should give the maximum range of travel of threaded member 18. Vertical movement of threaded member 18 is transmitted via holder 8 to pin 2 by means of a transmission element, in this case a pin 23, which is slidably mounted with virtually no play in a bore 24 in block 4. A compression spring 25 is arranged between a projection 26 on block 4 and pin 20 to prevent play, as in the case of tension spring 11; in this case, however, spring 25 prevents play in the threads of parts 17 and 18 and 4.

Adjusting means 1 functions in essentially the following manner. When sleeve 17 is rotated, for example, in a clockwise direction, it moves threaded member 18 vertically downwards. Pin 23 is displaced in a horizontal direction by the upper inclined surface of groove 22 and in turn displaces holder 8 and the upper end of the pin 2 horizontally to the same extent, as a result of which pin 2 is caused to pivot in the plane of the drawing.

The adjustment angle $\gamma$ is directly dependent on the difference between the pitches of the outer and inner threads on sleeve 17 and on the angle of slope of the inclined surface of groove 22. Pin 2 can be adjusted accurately to a deviation of $\pm 0.1$ mm from its vertical position, this deviation being in a defined plane, namely adjustment plane V.

FIG. 2 shows diagrammatically the position of the planes with respect to one another. E is the reference plane, and V is the most advantageous adjustment plane if B denotes the theoretically ideal plane in which the tape runs. The V plane is thus at right angles to the B plane, so that tape skew or head gap tilt can be compensated for or checked with the aid of an adjusting means 1 which acts in the V plane. Of course, it is also possible (cf. FIG. 5, right-hand tape guide roll 27) to arrange adjusting means 1 in such a way that the adjustment plane coincides with plane B, so that the roll axis is adjusted in the direction of tape travel. The adjusting means can of course also act in all other planes located between these adjustment planes V and B and at right angles to reference plane E, it only being necessary to provide an appropriate number of suitable fixing and positioning elements, e.g. conical pins 5, conical holes 6 and centering bearing 10, in appropriate positions. In principle, it is also possible to alter the tape path in a cassette by switching such guide elements around, for example in order to accommodate different tape roll diameters in the cassette, or for other reasons which may have to do with a different tape thickness, a different number of heads or different head dimensions, etc.

Experiments have shown that adjustment of the tape guide elements (or of the heads, as mentioned above) at right angles (plane V) to plane B has a much greater effect on the losses due to head gap tilt than does adjustment in the direction of tape travel or parallel to this direction. It is possible according to the invention to effect adjustment in both these planes or in all other planes therebetween with an adjusting means having two micrometer screw devices or two individual adjusting means.

Various embodiments of magnetic tape cassettes having adjusting means are shown in FIGS. 3, 4 and 5. In these figures, 33 denotes the cassette housing, 31 and 32 the tape rolls, 27 and 28 the tape guide rolls, 29 the spring for the pressure pad and 30 the tape. The spring 29 may extend over virtually the entire length of the opening 34 for admitting the magnetic heads, as shown in FIG. 3. To guide pins 2a and 2b which can be adjusted by means of adjusting means 1a and 1b. In the embodiments of FIGS. 3 and 4, the tape guide rolls 27 and 28 are not adjustable. Their axes, 2c and 2d, can, however, be made adjustable via means 1c and 1d, as shown in FIG. 5. Although means 1c and 1d are shown at right angles to one another, it is of course also possible to arrange them in a very large number of intermediate positions. In FIGS. 3 and 5, the guide pins 2a and 2b can be associated with a common adjusting means (as indicated by the dashed lines) comprising a member having an inclined surface, which simultaneously acts on both pins. The said member may be, for example, an elongate wedge which can be moved up and down, and which, when actuated, displaces two connecting pins 23 horizontally, resulting in adjustment of the two pins 2a and 2b. FIG. 4 shows two adjusting means, 1a and 1e on the one hand and 1b and 1f on the other hand, on each side of opening 34.

In FIGS. 3, 4 and 5, all sleeves 17 are visible from above, so that the paths along which the tape guide elements are displaced are in the plane of the drawing. As a result, adjustment of the guide elements is only possible for one direction of tape travel.

To obtain optimum results, it is particularly important that the last tape guide element before the head in the direction of tape travel, (eg. pin 2a in FIGS. 3, 4 and 5) should be correctly adjusted. If the cassette is of a type which must be turned over to play the second track, the pin 2b in FIGS. 3, 4 and 5 should also be adjustable; however, adjustment must be effected from that side of the cassette which is opposite to that shown in the drawing and lies uppermost after the cassette has been turned over. Adjusting means 1 is then inverted vertically with sleeve 17 and member 18 pointing downwards. Second in importance as far as tape guidance is concerned are the axles 2c and 2d of tape guide rolls 28 and 27 respectively which are associated with adjusting means 1c and 1d. Pins 2e and 2f need be adjustable only if higher tape guidance requirements have to be met. It is also possible to provide further adjustable guide elements along the inside of the front wall or between the front wall and the tape rolls.

In the conventional reference cassette, the range of adjustment of the tape guide pins next to the opening for the admission of the heads is from 88.05° to 91.95° ($\gamma = \pm 1.95°$), relative to the reference plane; this corresponds to rotation of the adjustment screw through an angle of about 120°. This angular range corresponds to a travel of the guide pin of $\pm 0.13$ mm in the case of a 3.81 mm wide cassette tape. However, a misalignment error of $\alpha = 0.75°$ occurs in the direction of tape travel. This additional error is only completely compensated for in exceptional cases (i.e. in the case of an equally large opposing azimuth error), so that in the normal case the reference cassette produces a misalignment error which contributes substantially to azimuth losses, in particular at high frequencies.

The present novel adjusting means permits precise adjustment of the guide elements (or of a magnetic head) in the same angular range of about 88°–92° ($\gamma \sim 2°$); about four rotations of the adjusting screw are required for this range, with the result that very fine adjustment (about $\pm 0.001$ mm (1 $\mu$m), based on the tape width of 3.81 mm) is possible. This tolerance corresponds to an angle of less than $\Delta\gamma = 0.1°$. A misalignment error $\alpha$ is therefore completely eliminated. The present invention thus enables azimuth losses to be almost completely eliminated, so that the highest electroacoustical and electrovisual demands made on a tape guide system, in particular that in a magnetic tape cassette, can be met.

In FIGS. 6a and 6b, the adjustment angles $\alpha$ and $\gamma(\alpha=$angle in plane B), for the particular range of adjustment, are compared on the basis of the number of rotations of the particular adjusting screw. The dashed line refers to the conventional reference cassette, whose range of adjustment is very short (one third of a rotation), with the result that only coarse adjustment is possible. By contrast, the accuracy of adjustment in the case of the present invention (thick solid line) is about twelve times higher, which also makes adjustment much easier.

The adjusting means can be produced in any suitable manner. The parts forming the micrometer screw device, including the threads, can be produced by die casting or injection molding depending on the material of construction used; examples of suitable plastics materials are nylon, polyethylene, polyformaldehyde and polystyrene. It is thus possible to produce the novel adjusting means economically by mass-production methods.

In practice, it is advantageous to make a test recording in the frequency range from 6 to 10 kHz on one or more tracks, and then to so adjust the tape guide elements (or the magnetic head or heads), by ear or using a measuring instrument, that the maximum playback signal level is obtained for each direction of tape travel and each track on the tape. The optimum setting can then be retained for a particular recorder, and only has to be altered when another recorder is used, or if the recorder or cassette is subsequently damaged or becomes disadjusted.

We claim:

1. A magnetic tape cassette, in particular a compact cassette, having
   two horizontal walls, namely a top wall and a bottom wall,
   a plurality of vertical walls including a front wall having an opening for the admission of at least one magnetic head,
   guide means for the tape including at least one guide pin disposed laterally of one end of said opening, one end of said guide pin being fixed in one of said horizontal walls and the other end of said guide pin being a free end,
   a manually settable adjustment mechanism for adjusting the inclination of said guide pin in a selectable single vertical plane, said adjustment mechanism being in the form of a self-contained unit comprising a mounting block which, itself, is positionable relatively to said horizontal walls and, carried by said block, a micrometer screw device and a circular cam member having an annular groove with at least one inclined surface, said member being provided at one end of said adjustment device for axial displacement thereby,
   a linkage controlled by said circular cam member and engaging said free end of the guide pin for varying the inclination of said pin in said selectable single vertical plane, and
   means for selectively securing said mounting block and hence said manually settable adjustment mechanism on one of said horizontal walls in one of a plurality of vertical planes, and for allowing the plane in which the inclination of said guide pin is adjusted by said mechanism to be altered by enabling the mounting block to be moved to and secured in a different one of said plurality of vertical planes.

2. A magnetic tape cassette as claimed in claim 1, wherein the micrometer screw device is designed so that a plurality of manual rotations of said device are required to produce the maximum axial displacement of said circular cam member.

3. A magnetic tape cassette as claimed in claim 1, wherein the free end of said guide pin is movable in a holder which forms part of said linkage and is guided in said vertical plane.

4. A magnetic tape cassette as claimed in claim 1, wherein the tape guide means include tape pins adjacent both ends of said opening and also guide members near the corners of the cassette for changing the direction of the tape, and
   wherein a separate manually settable adjustment mechanism is provided for each of the guide pins closest to the ends of said opening.

5. A magnetic tape cassette as claimed in claim 4, wherein a common adjustment mechanism is provided for a plurality of tape guide pins at one end of said opening.

6. A magnetic tape cassette as claimed in claim 4, wherein a separate adjustment mechanism is provided for each of the tape-direction-changing guide means.

7. A magnetic tape cassette as claimed in claim 1, wherein said securing means include a set of conical pins in said mounting block and a plurality of corresponding mounting holes in said horizontal wall into which said pins can be selectively inserted.

* * * * *